United States Patent
Zhou

(10) Patent No.: US 10,762,723 B1
(45) Date of Patent: Sep. 1, 2020

(54) SYSTEMS AND METHODS FOR DYNAMICALLY CONTROLLING PARKING RATES AT A PARKING FACILITY

(71) Applicant: Denso International America, Inc., Southfield, MI (US)

(72) Inventor: Yumeng Zhou, Southfield, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 16/382,594

(22) Filed: Apr. 12, 2019

Related U.S. Application Data

(63) Continuation-in-part of application No. 16/292,881, filed on Mar. 5, 2019.

(51) Int. Cl.
  *B60Q 1/48* (2006.01)
  *G07B 15/02* (2011.01)
  *G08G 1/14* (2006.01)
  *G06Q 30/02* (2012.01)

(52) U.S. Cl.
  CPC ......... *G07B 15/02* (2013.01); *G06Q 30/0206* (2013.01); *G08G 1/146* (2013.01)

(58) Field of Classification Search
  CPC ..... G07B 15/02; G06G 30/0206; G08G 1/146
  See application file for complete search history.

(56) References Cited

U.S. PATENT DOCUMENTS

| | | | |
|---|---|---|---|
| 6,502,011 B2 | 12/2002 | Haag | |
| 9,139,199 B2 | 9/2015 | Harvey | |
| 2016/0358473 A1* | 12/2016 | Scofield | G08G 1/147 |
| 2018/0096263 A1* | 4/2018 | Modi | G07B 15/00 |
| 2018/0121971 A1* | 5/2018 | Taneja | G06Q 30/0284 |
| 2018/0218605 A1* | 8/2018 | Mowatt | G08G 1/144 |
| 2020/0018602 A1* | 1/2020 | Beaurepaire | G08G 1/096827 |

* cited by examiner

*Primary Examiner* — Phung Nguyen
(74) *Attorney, Agent, or Firm* — Christopher G. Darrow; Darrow Mustafa PC

(57) ABSTRACT

System, methods, and other embodiments described herein relate to controlling a parking facility. In one embodiment, a method of controlling a parking facility control system is disclosed. The method includes selecting a pricing model, from a set of models based, at least partially, on historical data that indicates past parking rates and past usage levels of the parking facility. The method includes determining, periodically, a dynamic parking rate according to the pricing model. The method includes, in response to receiving a parking request for a vehicle, determining a current parking rate for the vehicle according to at least the dynamic parking rate and attributes of the parking request that indicate at least a parking duration that the vehicle is estimated to be parked at the parking facility. The method includes transmitting a parking notification to the vehicle, the parking notification indicating a parking space and the current parking rate.

20 Claims, 8 Drawing Sheets

| RID | UID | PID | Time | Est. Duration | Rate | Act. Duration |
|---|---|---|---|---|---|---|
| 1327 | 555-123-1234 | A12 | 9:15 | 2.25 | $7.00 | 2.5 |
| 1328 | 777-345-3456 | C56 | 9:17 | 3.5 | $7.00 | 4 |
| 1329 | 555-345-3456 | A38 | 9:18 | 1 | $7.77 | 0.5 |
| 1330 | 222-567-5678 | D62 | 9:20 | 5 | $6.00 | 5 |

| Category | Time | Median Parking | Parking Rate |
|---|---|---|---|
| Short-term | 2 | 327 | $8.00 |
| Short-term | 3 | 335 | $8.00 |
| Short-term | 4 | 332 | $7.85 |
| Short-term | 5 | 329 | $7.70 |

SYSTEMS AND METHODS FOR DYNAMICALLY CONTROLLING PARKING RATES AT A PARKING FACILITY

CROSS-REFERENCE TO RELATED APPLICATIONS

This application is a continuation-in-part of U.S. patent application Ser. No. 16/292,881, titled "SYSTEMS AND METHODS FOR MANAGING A PARKING FACILITY," filed on Mar. 5, 2019, the entire contents of which are incorporated herein by reference.

TECHNICAL FIELD

The subject matter described herein relates to systems and methods for controlling a parking facility, and, more particularly, to determining dynamic parking rates for parking spaces according to one or more optimization models and historical data.

BACKGROUND

Efficient control of parking in high traffic areas can present significant challenges, particularly regarding parking rates. High parking rates can result in declining visits from patrons and lead to a decrease in revenue for local businesses. A conventional parking facility may offer a pre-determined pricing scheme, including a static "early-bird" price, a static daytime price, and a static evening price. However, this simplistic model often fails to achieve a responsive supply-demand pricing scheme that more accurately reflects the moment-to-moment market value of a parking place, fails to maximize profit for the parking facility, and/or fails to actively respond to demand and to attract customers.

Conventional parking facilities also fail to attract customers by failing to communicate prices in a manner that takes advantage of modern vehicle capabilities. For example, customers in fully and partially autonomous vehicles are becoming more prevalent and may be attracted to facilities that take advantage of their vehicles' capabilities. Such vehicles may be equipped to communicate with third party systems, such as other vehicles or a parking facility, and may be capable of wirelessly receiving pricing and parking information and even autonomously parking in a parking space. Yet, conventional parking facilities do not exploit these trends in any significant way that impacts the customer experience of the facility.

SUMMARY

In one embodiment, example systems and methods associated with determining a dynamic parking rate according to one or more models, historical data that reflects demand, and other factors are disclosed.

For example, a parking facility control system is disclosed. In one approach, the disclosed system includes one or more processors and a memory communicably connected to the one or more processors. The memory can store a control module including one or more instructions that, when executed by the one or more processors, cause the one or more processors to select a pricing model from a set of models based at least in part on historical data that indicates past parking rates and past usage levels of the parking facility, periodically determine a dynamic parking rate according to the pricing model, and, in response to receiving a parking request for a vehicle, determine a current parking rate for the vehicle according to at least the dynamic parking rate and attributes of the parking request that indicate at least a parking duration that the vehicle is estimated to be parked at the parking facility. The memory can further store a communication module including one or more instructions that, when executed by the one or more processors, cause the one or more processors to transmit a parking command to the vehicle, where the parking command indicates a parking space and the current parking rate.

In one embodiment a method of controlling a parking facility is disclosed. The method includes selecting a pricing model, from a set of models based, at least in part, on historical data that indicates past parking rates and past usage levels of the parking facility, determining, periodically, a dynamic parking rate according to the pricing model, in response to receiving a parking request, determining a current parking rate for the vehicle according to at least the dynamic parking rate and attributes of the parking request that indicate at least a parking duration that the vehicle is estimated to be parked at the parking facility, and transmitting a parking notification to the vehicle, the parking notification indicating a parking space and the current parking rate.

In one embodiment, a non-transitory computer-readable medium is disclosed. The computer-readable medium stores instructions that when executed by one or more processors cause the one or more processors to perform the disclosed functions. The instructions include instructions to select a pricing model from a set of models based, at least in part, on historical data that indicates past parking rates and past usage levels of the parking facility, determine, periodically, a dynamic parking rate according to the pricing model, in response to receiving a parking request for a vehicle, determine a current parking rate for the vehicle according to at least the dynamic parking rate and attributes of the parking request that indicate at least a parking duration that the vehicle is estimated to be parked at the parking facility, and transmit a parking notification to the vehicle, the parking notification indicating a parking space and the current parking rate.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6 illustrates an example representation of a log data structure according to the disclosed subject matter.

FIG. 8 illustrates an example representation of a pricing model dataset according to the disclosed subject matter.

DETAILED DESCRIPTION

Systems, methods and embodiments associated with determining dynamic parking rates to charge for parking spaces in the parking facility are disclosed. That is, in contrast to a set of static parking rates that are the same every day, the disclosed embodiments provide models and techniques for continually adjusting parking rates according to, for example, optimization models and historical demand. Thus, the dynamic parking rates described herein can change, e.g., from day to day or in shorter/longer time intervals. The disclosed embodiments provide multiple improvements that enhance a user experience in parking at a parking facility and can lead to increased revenue for the parking facility and more efficient use of the parking facility. The improvements include providing better pricing for parking spaces through a dynamic price structure, utilizing autonomous vehicle capabilities in drop-off and pickup of a vehicle, and rewarding users who show a history of responsible pickups, e.g., with reduced parking rates.

In one embodiment, a parking facility control system receives a communication from a user indicating that the user plans to park a vehicle at the facility. The communication can include information such as an identifier for the user, identifier for the vehicle, and a parking duration estimate (e.g., a drop-off time for the vehicle and a pickup time for the vehicle). In response to receiving the parking request, the control system can, in one approach, select a parking space and determine a parking rate that has been dynamically determined for the parking space according to one or more of: 1) a rate optimization model, 2) historical data, such as price-demand data and parking space utilization, 3) current parking space availability, and 4) past behavior of the user. The system can transmit a notification to the user indicating the selected parking space and the dynamically determined parking rate. When the user confirms the rate, the system can reserve the parking space for the vehicle.

The system can further transmit a parking command to a cause an autonomous or semi-autonomous vehicle to park in the parking space. Herein, an autonomous or semi-autonomous vehicle refers to a vehicle that is capable of at least a degree of moving, maneuvering, path finding or the like without direct manual control exerted by a human being. Accordingly, an autonomous or semi-autonomous vehicle that receives the parking command can proceed to automatically park in the parking space while the user departs to engage in the subject of the user's visit to the area.

Figure 1:
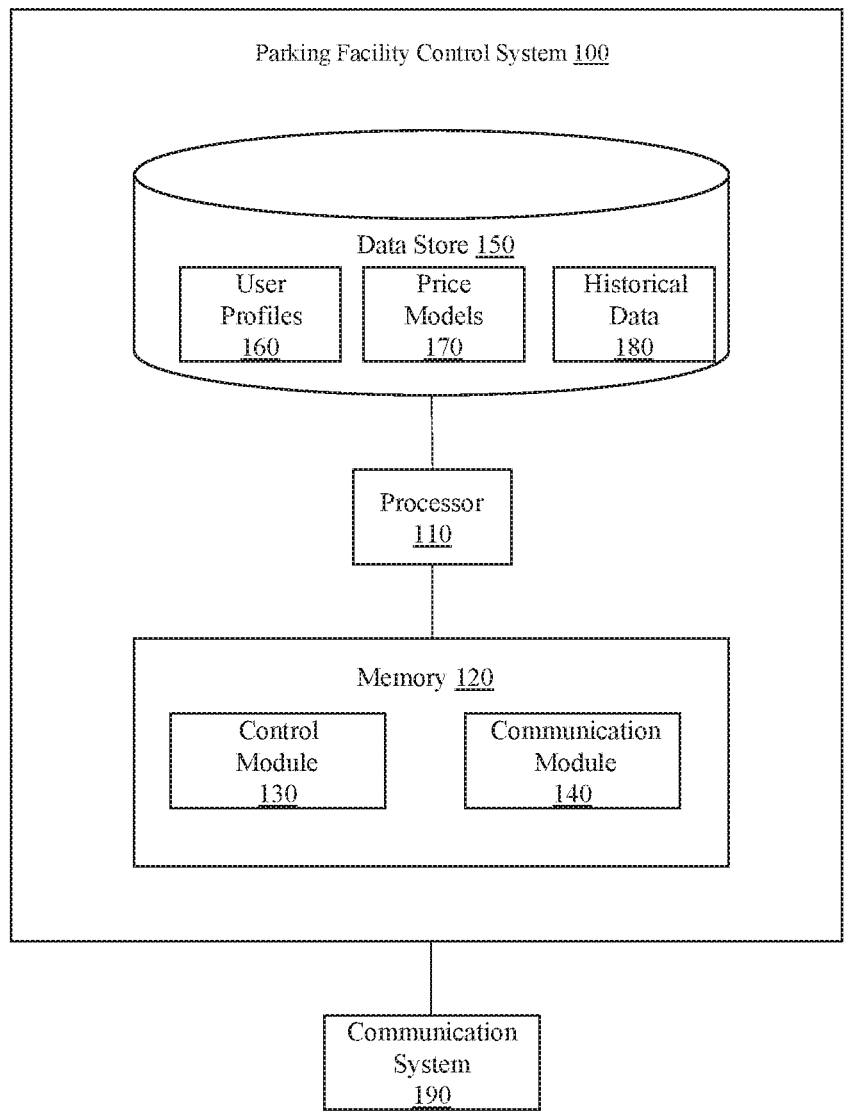
FIG. 1 illustrates one embodiment of a parking facility control system according to the disclosed subject matter.

Referring to FIG. 1, one embodiment of a parking facility control system 100 is illustrated. While arrangements will be described herein with respect to the parking facility control system 100, it will be understood that embodiments are not limited to a unitary system as illustrated. In some implementations, the parking facility control system 100 may be embodied as a cloud-computing system, a cluster-computing system, a distributed computing system (e.g., across multiple facilities), a software-as-a-service (SaaS) system, and so on. Accordingly, the parking facility control system 100 is illustrated and discussed as a single facility system for purposes of discussion but should not be interpreted to limit the overall possible configurations in which the disclosed components may be configured. For example, the separate modules, memories, databases, and so on may be distributed among various computing systems in varying combinations.

The parking facility control system 100 also includes various elements. It will be understood that in various embodiments and configurations depending on the actual layout and implementation, it may not be necessary for the parking facility control system 100 to have all of the elements shown in FIG. 1. The parking facility control system 100 can have any combination of the various elements shown in FIG. 1. Further, the parking facility control system 100 can have additional elements to those shown in FIG. 1. In some arrangements, the parking facility control system 100 may be implemented without one or more of the elements shown in FIG. 1. Further, while the various elements are shown as being located within the parking facility control system 100 in FIG. 1, it will be understood that one or more of these elements can be located external to the parking facility control system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the parking facility control system 100 is implemented to perform methods and other functions as disclosed herein relating to managing a parking facility, selecting parking spaces for incoming vehicles, and dynamically setting parking prices. The noted functions and methods will become more apparent with a further discussion of the figures. Furthermore, the parking facility control system 100 is shown as including a processor 110. Thus, in various implementations, the processor 110 may be a part of the parking facility control system 100, the parking facility control system 100 may access the processor 110 through a data bus or another communication pathway, the processor 110 may be a remote computing resource accessible by the parking facility control system 100, and so on. In either case, the processor 110 is an electronic device such as a microprocessor, an ASIC, or another computing component that is capable of executing machine-readable instructions to produce various electronic outputs therefrom that may be used to control or cause the control of other electronic devices.

In one embodiment, the parking facility control system 100 includes a memory 120 that stores a control module 130 and a communications module 140. The memory 120 is a random-access memory (RAM), read-only memory (ROM), a hard-disk drive, a flash memory, or other suitable memory for storing the modules 130 and 140. The modules 130 and 140 are, for example, computer-readable instructions that when executed by the processor 110 cause the processor 110 to perform the various functions disclosed herein. In various embodiments, the modules 130 and 140 can be implemented in different forms that can include but are not limited to hardware logic, an ASIC, components of the processor 110, instructions embedded within an electronic memory, and so on.

With continued reference to the parking facility control system 100, in one embodiment, the system 100 includes a data store 150, which may be implemented as a database. The database is, in one embodiment, an electronic data structure stored in the memory 120, a distributed memory, a cloud-based memory, or another data store and that is configured with routines that can be executed by the processor 110 for analyzing stored data, providing stored data, organizing stored data, and so on. Thus, in one embodiment, the data store stores data used by the modules 130 and 140 in executing various determinations. In one embodiment, the data store 150 stores data including user profiles 160, price models 170, and historical data 180.

The parking facility control system 100 can also include a communication system 190 that allows the communication module 140 to communicate with, for example, communication networks, vehicle systems, mobile computing devices, and other systems. The communication system 190 can be configured to communicate, for example, over a local area network, a wide area network, directly with a target system via an established protocol such as vehicle-to-everything (V2X), or through other communications methods.

Figure 2A:
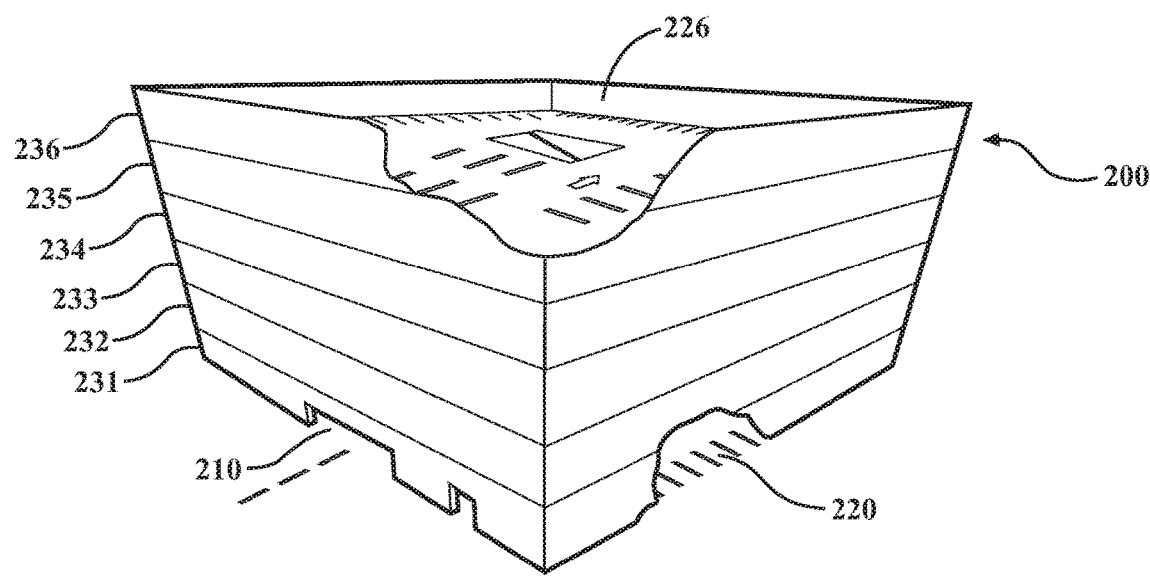
FIG. 2A illustrates a perspective view of a parking facility that can implement a parking facility control system according to the disclosed subject matter.
Figure 2B:
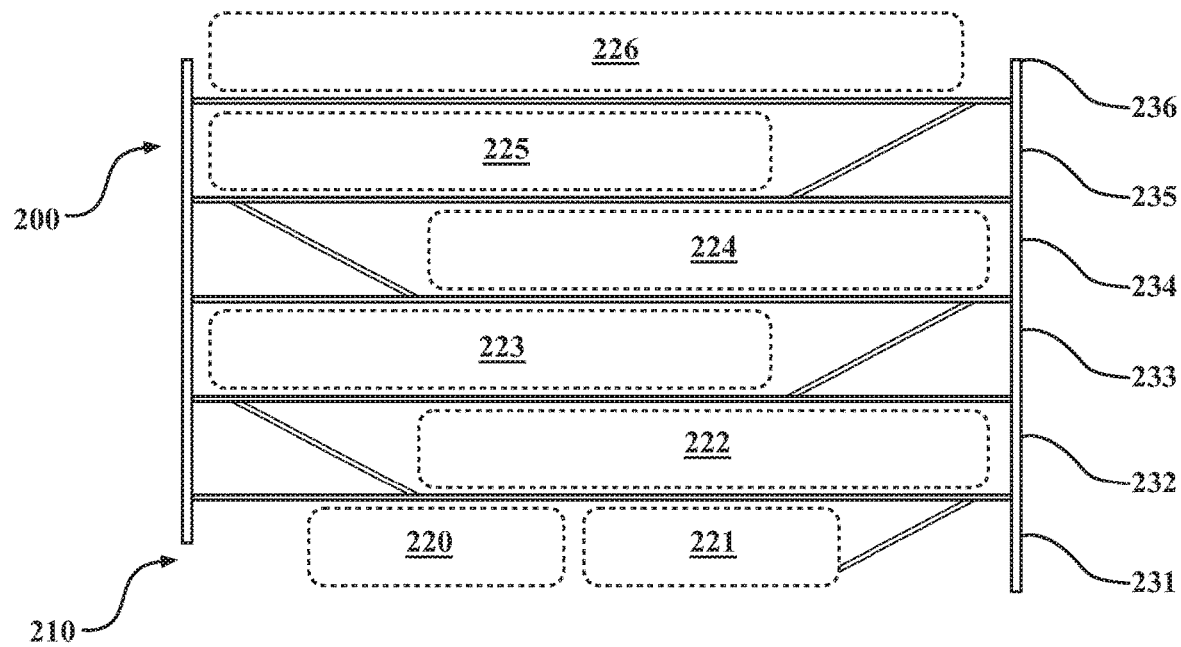
FIG. 2B illustrates a cut-away side view of a parking facility control system according to the disclosed subject matter.

FIGS. 2A and 2B illustrate views of an example parking facility 200 that can implement or be controlled by the disclosed parking facility control system 100. Although the facility 200 is depicted as a multi-floor structure, the disclosed subject matter is not limited to this particular implementation and can be applied to parking facilities of different layouts, configurations or sizes. For example, the disclosed subject matter can be applied to parking facilities comprised of multiple sites within a certain proximity. The example parking facility 200 includes an entrance 210 and multiple floors (e.g., 231-236). The parking facility control system 100 can be installed at the parking facility 200 or at a remote location in communication with the facility 200.

The parking facility control system 100 can categorize parking areas (e.g., 220-226) in the parking facility 200. The categorization can be based on, for example, physical structure or various metrics that relate to comparative advantages. Such metrics can be determined based on features or characteristics that are specific to the facility 200 or generic factors. As an example of physical structure categorization, the system 100 can categorize parking areas in the facility 200 based on which floor the parking area is on. That is, the system 100 can categorize parking area 221 on the first floor 231 as a first area and a parking area 226 on the sixth floor 236 as a different area with respective floors therebetween also categorized uniquely. As an example of other types of categorization, in one or more embodiments, the system 100 can categorize parking areas based on respective distances from the entrance 210 to the facility 200, proximity to stairwells, proximity to security devices, etc.

In operation, in one or more embodiments, the communication system 190 that is operably connected with the parking facility control system 100 can receive and relay a parking request from a user who intends to utilize the facility 200, i.e., to park a vehicle at the facility for an amount of time and return to retrieve the vehicle.

Figure 3:
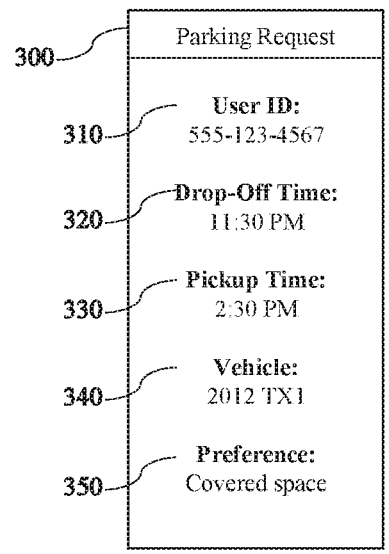
FIG. 3 illustrates an example representation of a parking request according to the disclosed subject matter.

FIG. 3 illustrates a representation of an example parking request 300. The user can complete the parking request 300, for example, via an application running on a mobile phone, a form on a website, a text message, or other communication form. The communication system 190 can receive the parking request 300 from, for example, a network communication from a mobile phone, a car phone, a computing device, or other communication device, and relay the information contained therein, e.g., to the control module 130.

The parking request 300 can include an identifier (ID) 310 that is associated with the user sending the request. The ID can be established as, for example, a phone number, a name, code, a vehicle identification number (VIN), or other ID. For example, in one or more embodiments the ID is an encoded ID created according to a protocol established for communication with the parking facility control system 100, where the encoded ID is not connected to any other information about the user to protect the user's privacy.

The parking request 300 can further include a drop-off time 320 that indicates a time or a window of time during which the anticipates dropping off his/her vehicle at the facility, and a pickup time 330 that indicates a time or a window of time during which the user anticipates returning to the facility 200 to retrieve his/her vehicle. In addition, as will be discussed below, the pickup time 330 functions as an indicator of the user's ability or tendency to accurately predict the user's own behavior.

The parking request 300 can further include additional information, such as vehicle information 340 (e.g., a model and year of the vehicle) and a parking preference 350. The parking preference 350 can be generic or specific to the facility 200. For example, in a hypothetical parking facility attached to a mall with multiple floor exits leading to different floors of the mall, a preference 350 could reference a particular store, theater or the like that the user intends to visit (e.g., "Near Super Store"). As another example, in a parking facility that has covered above-ground parking, uncovered above-ground parking, and underground parking, a preference 350 could indicate, "Covered above-ground parking."

Upon receiving the parking request 300 the control module 130 can check to see whether the ID 310 is already associated with one of the user profiles 160 in the data store 150. If no corresponding profile exists, the system 100 can create a profile.

Figure 4:
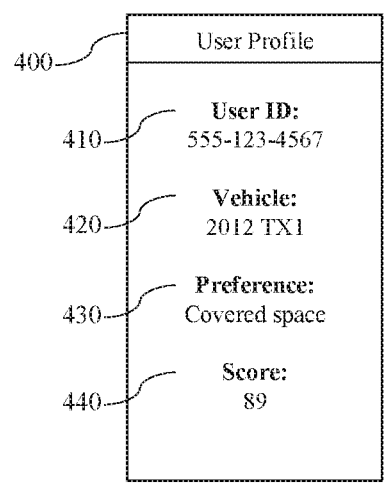
FIG. 4 illustrates an example representation of a user profile according to the disclosed subject matter.

FIG. 4 illustrates a representation of an example user profile 400. The user profile 400 can be a data structure that includes information such as the user's ID 410, the user's vehicle 420, user parking preferences 430 and a user score 440 that reflects how often the user is timely in picking up the user's vehicle. The user profile 400 does not need to include each of the types of information shown in FIG. 4 and can include other types of information not shown.

In one or more embodiments, the control module 130 can select a parking space for the user and assign a dynamically determined parking rate for the parking space. That is, in contrast to a conventional parking facility that typically has one or two static parking rates (e.g., "early bird" rate, normal rate), the control module 130 can, on an ongoing basis, determine dynamic parking rates for a given set of parameters, such as one or more of a duration of parking time that the vehicle is anticipated to remain at the facility 200 as indicated in the parking request 300, a day of the week the parking request 300 is received, or a time segment of the day during which the parking request 300 is received. For the given set of parameters, the control module 130 can determine a dynamic parking rate that changes according to, for example, historical data indicating previous parking space rates and availability in association with a time frame of the parking request 300, one or more different types of optimization models, potential discounts rewarding past behavior of the user as indicated by the user score 440, and other additional factors, as will be discussed further below.

Figure 5:
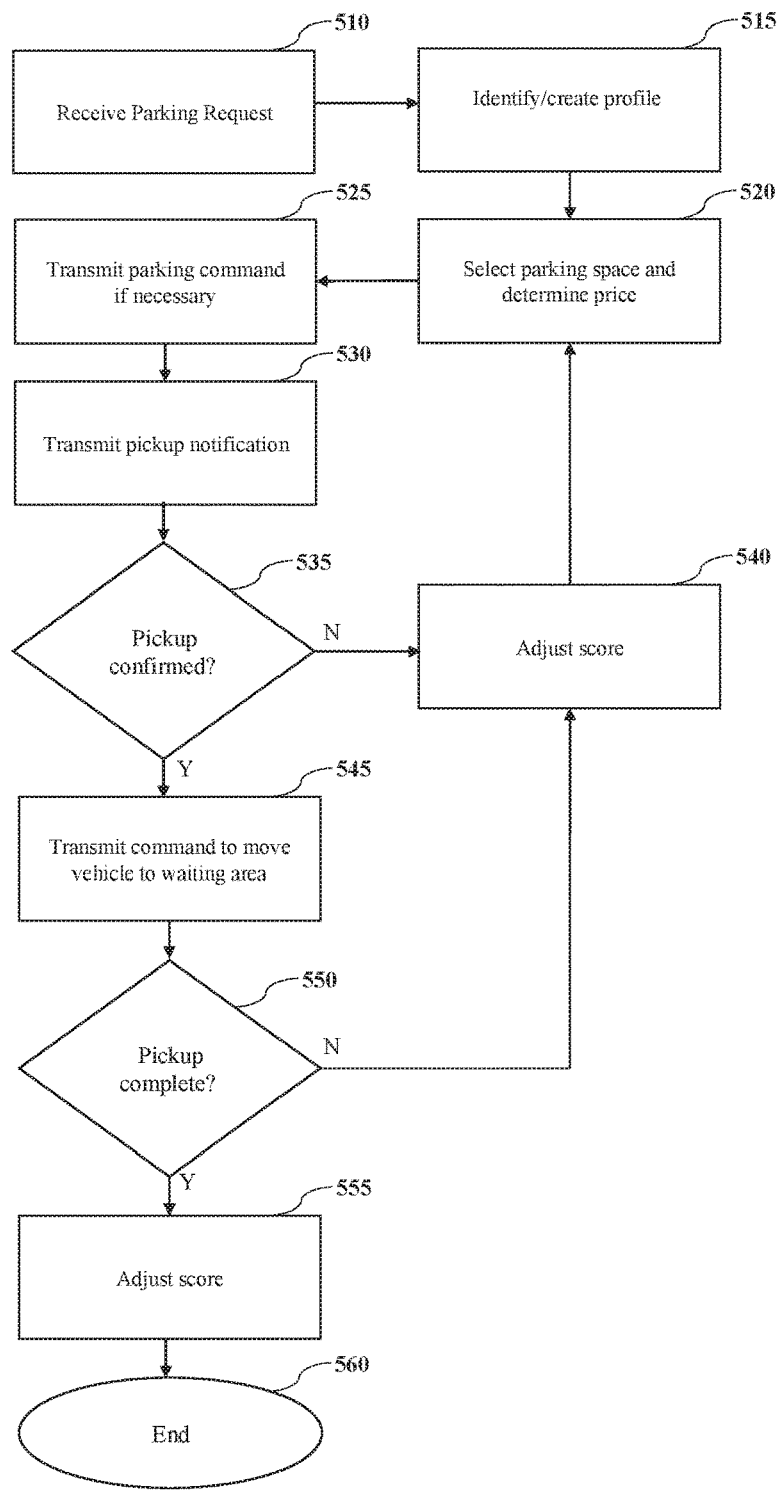
FIG. 5 illustrates a flow chart of a method of determining parking rates and managing the parking of vehicles in a facility according to the disclosed subject matter.

FIG. 5 illustrates a flowchart of a method 500 that is associated with parking space selection and parking space management operations of the disclosed parking facility control system 100. The method 500 will be discussed from the perspective of the disclosed parking facility control system 100 of FIG. 1 and parking facility 200 of FIGS. 2A and 2B. While the method 500 is discussed in combination with the system 100 and facility 200, it should be appreciated that the method 500 is not limited to being implemented within the system 100 and the facility 200 but are merely one example of a system and facility that may implement the method 500. Moreover, while the method 500 generally relates to parking space selection and management, the method 500 illustrates a contextual overview of how the disclosed approaches may determine dynamic parking rates within the broader context of facility management.

At operation 510 the communication system 190 receives a parking request from a user and relays the information contained therein to the control module 130. In one or more embodiments, the parking request includes an ID and a parking duration, e.g., defined by a drop-off time and a pickup time. In other embodiments, the parking request includes additional information, such as vehicle information and user parking preferences.

At operation 515 the control module 130 identifies a profile associated with the ID, and if no profile exists, the control module 130 creates a new profile. The profile can be stored, for example, in the data store 150. When creating a new profile, the control module 130 can assign the profile a neutral parking score. The parking score functions as an indicator of the user's historical behavioral trends regarding how accurate the user is in setting a pickup time and how timely a user is in following through to meet that pickup time. The parking score can be a numerical integer value, or some other form suitable to cover a range of measurements. For example, in one implementation the parking score can range from 0 to 100 with a score of 0 representing frequent untimeliness and a score of 100 representing frequent timeliness. In this example, the control module 130 may assign an initial neutral parking score of 50 to new profiles. Subsequent actions by the user can affect the parking score in a positive or negative way.

At operation 520 the control module 130 selects a parking space and determines a parking rate for the parking space. In one or more embodiments, the control module 130 can utilize an algorithm that selects a parking space based on the parking score, available parking spaces in the facility 200, and the pickup time. For example, the control module 130 may use the parking algorithms described in U.S. patent application Ser. No. 16/292,881.

The parking rate determination in operation 520 further illustrates a general operational context in which the dynamic parking rates of the disclosed subject matter may be applied. As will be discussed in greater detail further below, the parking rate can be dynamically determined for a given set of parameters using any of the various techniques or pricing models. The parking rate can further be adjusted based on the user's parking score, e.g., the control module 130 can allot a discount if the parking score is above a reward threshold or some other threshold level. The communication module 140 can transmit the parking price to the user and prompt the user to confirm acceptance of the parking price.

At operation 525, when the vehicle arrives at the facility 200 to park, the communication module 140 can direct the vehicle to park. In one embodiment, the communication module 140 directs the vehicle based, at least in part, on whether the vehicle is an autonomous or semi-autonomous vehicle or a manual vehicle.

In the case of the vehicle being an autonomous or semi-autonomous vehicle capable of self-parking, the communication module 140 directs the vehicle by transmitting a "parking command" to the vehicle. The parking command can include instructions that enable the vehicle to navigate to a given parking space. The instructions can include, for example, a parking space number, a facility map/floor plan, a coordinate, a turn by turn instruction list, or the like. Thus, upon arrival at the facility 200 the user can exit the vehicle and depart to allow the vehicle to autonomously navigate to the assigned parking space.

In some cases, the vehicle might not have suitable autonomous capability, not be configured to communicate with the communication module 140, or, in some other way, be incapable of executing the parking command. In such cases, the communication module 140 can transmit the parking command to a communication device associated with the user or to a worker at facility 200, with the command including human readable instructions such as the parking space number, so that the user (or a worker) can manually navigate the vehicle to the selected parking space and park the vehicle.

At operation 530, the communication module 140 can transmit a pickup notification to the user via the communication system 190. The communication model 140 can transmit the pickup notification, for example, when the pickup time that was received in the parking request is approaching, at a set amount of time, e.g. ten minutes, prior thereto. The pickup notification can be transmitted, for example, via a text message, an email, a robocall, or the like. The pickup notification notifies the user that the pickup time is approaching and requests confirmation that user will retrieve the vehicle at the pickup time, or confirmation that the user will not retrieve the vehicle at the pickup time and instead intends to request an extension of parking time. If the user does not respond or responds with a request for an extension of time, at operation 540, the control module 130 may adjust the parking score, e.g., lower the score by an incremental amount to represent the occurrence of the user failing to meet the original pickup time. Operational flow then returns to operation 520 for the control module 130 to select a parking space and determine the price for the continued time. In this cycle, if the parking score has not fallen below the timeliness threshold, the control module 130 may select the same parking space and therefore no change is necessary. However, if the score has fallen below the timeliness threshold, or other circumstance have changed (e.g., increased demand of parking), the control module 130 may select a new parking space for the vehicle, e.g., in a parking area that is farther away than the current parking area. In this case at operation 525 the communication module 140 will transmit a parking command to move the vehicle to the newly selected parking space.

Conversely, if the user confirms the pickup at operation 535, then at operation 545 the communication module 140 transmits a parking command that causes the vehicle to be moved (i.e., autonomously or manually by a worker, depending on capability) to a parking space in the pickup area 220. As shown in FIG. 2B, the pickup area 220 can be a parking area near an entry/exit point 210 of the facility 200, however, this is only one example layout. In implementation, the pickup area 220 can be disposed in other locations, such as near a store entrance, near an elevator, or other locations.

The pickup area 220 can include sensors that allow that system 100 to detect the presence or absence of a vehicle that has been assigned to a pickup area 220 parking space. In one or more embodiments, the vehicle can communicate directly with the system 100, for example, through V2X communication to notify the system 100 of its location/departure. Thus, the system 100 can determine when the vehicle arrives at the pickup area 220 and whether the user has arrived and driven the vehicle out of the pickup area 220.

At operation 550, the system 100 waits for an amount of time and checks whether the pickup has been completed, i.e., the user has arrived, picked up the vehicle and left the facility. In one or more embodiments, the amount of time that the system allows the vehicle to remain in the pickup area 220 can be a function of the user score. For example, the higher the score, the more time the system 100 allows for the vehicle to remain in the pickup area 220, as high score users have demonstrated a likelihood of completing a pickup. However, if the system 100 detects that the vehicle has not been picked up by the expiration of the allotted time, then the control module 130 executes operation 540 to adjust the score (i.e. reduction) and cycles back to operation 520 to select a new parking space and determine a price for the extended parking time. That is, the control module can adjust a parking score associated with the user profile based on whether the vehicle is removed from the parking facility 200 within a determined time range of the original pickup time estimate.

Conversely, if the system 100 detects that the pickup has been completed, then at operation 555 the control module 130 adjusts the score accordingly (i.e., increase) and the process ends at operation 560.

Regarding determining the dynamic parking rate (i.e., in operation 520), in one or more embodiments, the control module 130 can determine the parking rate according to one or more factors, such as pricing models, the user's past behavior, and historical data (e.g., historical parking rates and historical occupancy rates). The control module 130 can further determine the dynamic parking rate in a manner that advances different goals, such as to optimize the profit gained by the parking facility 200 or to optimize the use of parking spaces in the parking facility 200.

The control module 130 can determine the dynamic parking rate on customizable levels of time intervals and parameters associated with the parking request. For example, in one or more embodiments the control module 130 can use segmentation to build multiple pricing model datasets that correspond with time segments within recurring time frames. Such segmentation allows the control module 130 to determine dynamic parking rates that capture distinctions in recurring demand patterns over relatively short periods of time. For example, in one or more embodiments the recurring time frames can correspond to days of the week, short-term holiday days, long-term holiday days, special event days, or other type of recurring time frames. The time segments can correspond to intervals of time (e.g., fifteen minutes, thirty minutes, etc.), having the same or different lengths, within the recurring time frames.

As an example, a hypothetical parking facility near a sports arena may typically experience high demand on Monday through Thursday from 7:00 AM to 9:00 AM and on game days. In this case, for example, the weekday "Monday" may be a recurring time frame, segmented into fifty time segments that divide up the operational hours of the parking facility, each time segment ranging from 15-30 minutes in length. Similarly, the weekday "Saturday" may be another recurring time frame, with forty time segments dividing up the shorter operation hours of the parking facility, each time segment ranging from 15-30 minutes in length. A "game day," regardless of its day of the week, may be another recurring time frame. These are merely example time frames and segmentations. In different implementations, the control module 130 can define different time frames and segmentations.

The control module 130 can merge the pricing model datasets of two or more recurring time frames if the datasets are significantly similar (e.g., in comparison, exhibit a level of differences below a threshold amount). For example, in the above-described hypothetical regarding the parking facility near a sports arena, the system may merge the pricing model datasets for Monday through Thursday into a single, average pricing model dataset.

Regarding the time segment durations, in one or more embodiments the control module 130 can determine the length of the time segments according to a rule or process that reduces a rate of change in parking space usage between time segments to below a threshold amount. That is, during times of heavy use of the facility the time segments will be shorter than during times of light use of the facility, such that a differential in rate of use of the facility between consecutive intervals does not exceed a threshold amount, e.g., no greater than a difference of thirty parking spaces.

The control module 130 can therefore build pricing model datasets to correspond with individual time segments. The control module 130 can, in one arrangement, further focus the price model datasets on individual parking length duration categories per time segment. That is, the control module 130 can create multiple parking length duration categories that group received parking requests according to the estimated parking durations indicated in the parking requests. For example, parking requests with estimated parking durations ranging from 0-1.5 hours can be categorized as "short-term," parking requests with estimated durations of 1.6-3 hours can be categorized as "short-mid-term," parking requests with estimated durations of 3.1-4.5 can be categorized as "mid-term," and so on. It should be understood that these are merely example categorical definitions. In implementation, categories of different durations and designations can be defined within the scope of the disclosed subject matter.

Thus, the control module 130 can build pricing model datasets that show, for example, a representation of how many vehicles parked under a given parking length duration category (e.g., how many vehicles are short-term parking) within a given time segment (e.g., from 9:00 AM-9:15 AM) in a given recurring time frame (e.g., Monday).

To collect data for building the pricing model datasets, the control module 130 stores historical data 180 in a log data structure that indicates, among other things, parking space occupancy and parking space rates over time. FIG. 6 shows an example log data structure 600 that the control module 130 can utilize to store historical data 180. The log data structure 600 can be implemented, for example, as a log database 600 stored in a table in data store 150. In one or more embodiments, the log database 600 can include a parking request identifier 610, a user identifier 620, a parking space identifier 630, a drop-off time 640, an estimated parking duration 650, a parking rate 660, and an actual duration 670. In other embodiments, the log database 600 need not include all of types of data shown here and can include other types of data not listed here.

The parking rate 660 refers to a cost per unit of time, e.g., $7.00 per hour, that the parking facility 200 will charge for a vehicle to remain in parking space. As will be seen below, the parking rate 660 for a given parking length duration category (e.g., short-term parking rate) is dynamic, not static. The control module 130 can determine or adjust the parking rate 660 through various methods, including using historical data 180 or using duration-based functions.

Figure 7:
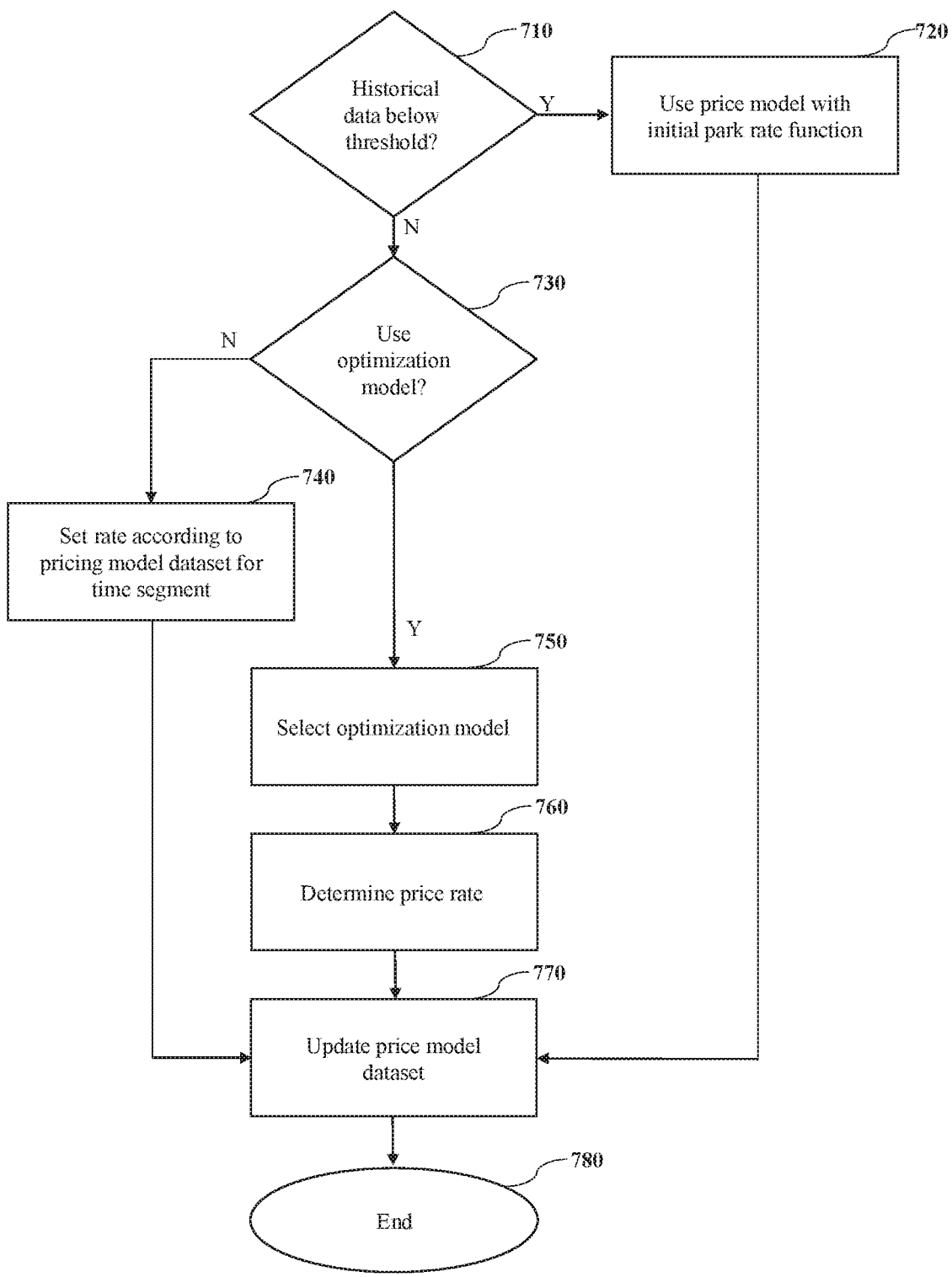
FIG. 7 illustrates a flow chart of a process to determine which method to use to calculate and optionally optimize the parking rate.

FIG. 7 shows one embodiment of a process 700 that the control module 130 can execute to select a pricing model to calculate, and optionally optimize, the dynamic parking rate 660. The pricing model can include or be defined as, for example, an initial park rate function, an optimization model, or a model to select a rate from historical data 180 without optimization. The control module 130 can execute the process 700 on a periodic basis (e.g., per recurring time frame, per segment, etc.) to continually determine whether to adjust/update the dynamic parking rate 660.

For example, the control module 130 can determine the dynamic parking rate 660 in consecutive instances of a given time segment as they continually occur in a recurring time frame. Moreover, by extension, the control module 130 can periodically determine/update one or more dynamic pricing rates corresponding to different parameters according to one or more different pricing models. For simplicity, in the discussion that follows the periodic basis will be considered as a per time segment basis, however, it should be clear that other periodic intervals can be used within the scope of the disclosed subject matter.

At operation 710, at the start of a time segment the control module 130 checks whether the log database 600 includes, for example, a sufficient number of entries to support determining a parking rate and/or optimizing the parking rate based on historical data 180. For example, for a given time segment (e.g., 9:00-9:15 AM) in a recurring time frame (e.g., a "Monday"), the control module 130 can determine whether the log database 600 has more than a threshold number of entries (e.g., >5) for the time segment. The threshold value can be, for example, a default setting or a value adjusted by a manager of the parking facility 200 appropriate to the implementation.

When the log database 600 includes fewer than the threshold number of entries, at operation 720 the control module 130 can select a pricing model that includes what will be referred to herein as an initial park rate function. The initial park rate function does not rely on historical data 180, but instead can be used to determine a parking rate 660 that is inversely proportional to the estimate parking duration 650 indicated in the parking request. For example, in one or more embodiments an initial park rate function can be defined as:

$$\text{Rate} = \left(m - \frac{m-n}{T}t\right) \quad \text{(Eq. 1)}$$

where m is a maximum parking rate at the facility 200, n is a minimum parking rate at the facility 200, t is a parking duration value, and T is a long-term parking threshold, which is the greatest amount of time for which a variable rate according to Eq. 1 can be applied. A parking request having a parking duration greater than T receives the minimum rate n.

Regarding the parking duration value t, in one or more embodiments the actual value of the parking duration 650 (e.g., from the parking request) can be used. In one or more other embodiments, a representative value can be determined for t according to the parking duration category that the parking duration 650 falls within. The representative value can be, for example, a median value for a given range and can apply to durations that fall within that range. As an example, a representative value of "1" can represent parking durations that fall within a "short-term" parking duration category encompassing a range from 0-2 hours, as "1" is the median value for this range. Similarly, a representative value of "3" can represent a "mid-short-term" parking duration category encompassing a range from 2-4 hours, and so on.

In one example implementation in which the control module 130 utilizes an initial park function, the parking facility 200 can operate with the following parameters (e.g., set by a facility manager): maximum parking rate of m=$8.00, minimum parking rate of n=$4.00, and long-term parking threshold of T=12 hours. Under these parameters, applying the example median representative value of t=1 for a parking request with a duration of 1.5 hours results in a rate of $7.77:

$$\$7.77 = \left(8 - \frac{8-4}{12}1\right)$$

A parking request for 3 hours (t=3) yields a rate of $7.00:

$$\$7.00 = \left(8 - \frac{8-4}{12}3\right)$$

It should be understood that the park rate function defined in Eq. 1 is merely one example of an initial park rate function. Different types of park rate functions can be defined within the scope of the disclosed subject matter to determine the parking rate as a function of the estimated parking duration without relying on historical data 180.

Referring back to FIG. 7, if the control module 130 determines that the log database 600 has a number of entries above the threshold, then the control module 130 proceeds, at operation 730 with selecting a different pricing model to determine the parking rate. For example, at operation 730, the control module 130, in one embodiment, determines whether to use a price model that is an optimization model. The control module 130 can base the determination on, for example, a parameter set by a manager of the parking facility 200 (e.g., the manager decides to optimize only during certain time frames), an amount of available historical data being above a threshold amount (e.g., only optimize if three full weeks of historical data have been collected), or based on other factors according to the implementation.

If the control module 130 determines not to use an optimization model, then at operation 740 the control module 130 determines the parking rate according to a history-based pricing model that uses what will be referred to herein as a pricing model dataset.

The control module 130 can create one or more pricing model datasets from the information in the log database 600 and update the one or more pricing model datasets on an ongoing basis. The pricing model datasets are focused, analytical data structures that can be used to identify and exploit historic trends in parking demand and parking rates per parking duration category, per time segment, per recurring time frame.

FIG. 8 shows a representation of an example pricing model dataset 800 for a recurring time frame. The pricing model dataset 800 can include a parking duration category 810, a time segment 820, the median parked vehicles 830, and the parking rate 840. The time segment 820, recall, is a defined interval having a start time and an end time (e.g., 9:00 AM-9:15 AM). The parking rate 840 is the rate that was applied for the parking duration category 810 during the time segment 820. The median parked vehicles 830 is the median number of vehicles that parked in the parking facility 200 under the parking duration category 810 designation during the time segment 820. The median parked vehicles 830 can be determined, for example, by:

$$MP = \frac{|NumParkedT_{Start} - NumParkedT_{End}|}{2} \quad \text{(Eq. 2)}$$

where MP is median parked vehicles, $NumParkedT_{Start}$ is the number of cars parked in the facility, under the parking duration category 810, at the start of the time segment 820, and $NumParkedT_{End}$ is the number of cars parked in the facility, under the parking category 810, at the end of the time segment 820.

Thus, in an example implementation including the example pricing model dataset 800, in response to a parking request for short-term parking received during the fifth time segment 820, the control module 130 can determine the parking rate 840 to be $7.70.

Alternatively, in one or more embodiments the control module 130 can determine the parking rate according to a total cost calculated as an integral over multiple time segments. That is, for example, when the parking request duration extends over multiple time segments (e.g., a four hour duration extending over twenty time segments), the control module 130 can determine the total cost as the sum of the cost in each of the segments, then determine the parking rate as the total cost divided by the parking request duration:

$$ParkingRate = \frac{TotalCost}{ParkingRequestDuration} \quad \text{(Eq. 3)}$$

Referring back to FIG. 7, after the parking rate is determined, at operation 770 the control module 130 updates the relevant price model dataset by creating a new entry in the dataset for the current time segment. That is, for example, referring to FIG. 8, if the current time segment 820 is "6" and the parking request was for short-term parking duration, the control module 130 determines the median number of vehicles parked 830 and stores the parking rate 840 in a new row, e.g.: ("Short-term", 6, 321, $7.70). The stored parking rate will serve as the parking rate for parking requests received for short-term parking duration during the next occurrence of the time segment.

Referring to FIG. 7, if at operation 730 the control module 130 determines that the conditions or parameters previously discussed indicate that an optimization model should be used as the price model, then at operation 750 the control module 130 selects an optimization model.

Similar to the determination described regarding operation 740, the control module 130 can select an optimization model based on, for example, a parameter set by a manager of the parking facility 200 (e.g., the manager decides to optimize for public usage during certain time frames), an amount of historical data being above a threshold amount (e.g., only optimize for profit if three full weeks of historical data have been collected), or based on other factors according to the implementation.

The optimization model can be designed to achieve a certain goal by adjusting a future parking rate based, at least in part, on the historical data 180 and theoretical assumptions. For example, one optimization model can be designed to optimize the public use of the parking facility, while another can be designed to optimize the profit gained by the parking facility. The optimization models can execute different strategies and techniques to achieve desired goals. Example optimization models will now be described, however, it should be understood that modified or different optimization models can be used within the scope of the present disclosure.

In one or more embodiments, the control module 130 can select a usage optimization model that adjusts the parking rate between a minimum rate and a maximum rate according to a rate adjustment strategy to attempt to reach or maintain a desired parking space occupancy percentage. The minimum rate and maximum rate can be set by a manager of the parking facility, for example, on a per time segment or per recurring time frame basis. The rate adjustment strategy is based on the theory that adjusting the parking rate can encourage or discourage use of the parking facility 200 by the public.

Figure 9:
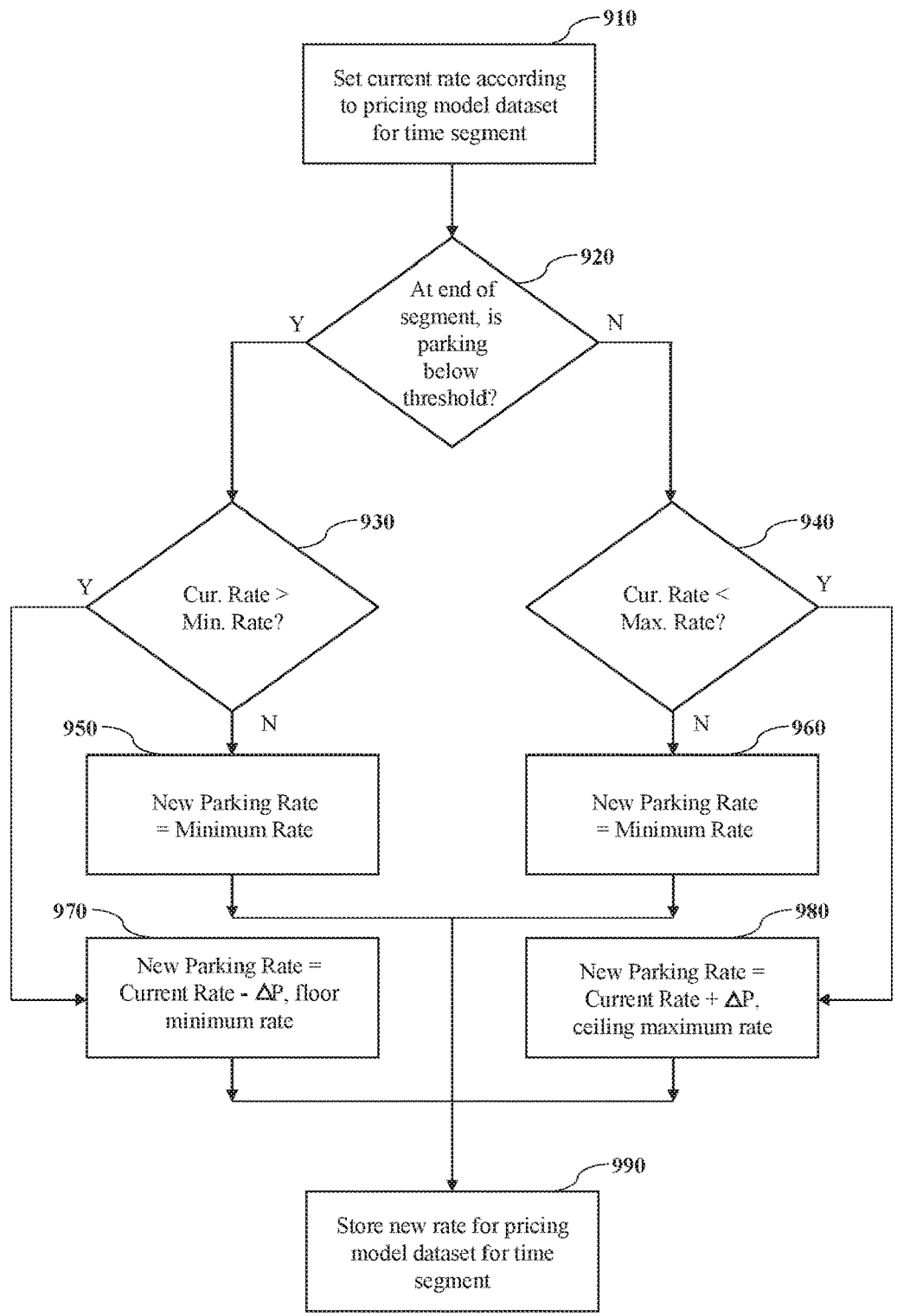
FIG. 9 illustrates a flow chart of a usage optimization model according to the disclosed subject matter.

FIG. 9 shows a flowchart of an example usage optimization model process 900. At operation 910 the control module 130 determines a current parking rate for a given parking duration category according to the pricing model dataset for the current time segment. The current parking rate defines the rate that will be applied for parking requests received during the current time segment.

At the end of the current time segment the control module 130 analyzes data and attempts to optimize the parking rate to improve usage of the parking facility. At operation 920 the control module 130 determines whether a total number of vehicles parked at the parking facility 200 is below a target threshold amount. The target threshold can be, for example, 90% of the full capacity of the facility 200, or a different value. The target threshold can be set by a manager of the parking facility 200, for example, on a per time segment or per recurring time frame basis.

If the number of parked vehicles is below the target threshold, at operation 930, the control module 130 checks whether the current parking rate (i.e., the rate that was determined at operation 910) is greater than the minimum parking rate. If the current parking rate not greater than the minimum rate, the control module sets the new parking rate to the minimum rate at operation 950. If the current parking rate is greater than the minimum rate, then at operation 970 the control module sets the new parking rate equal to: current parking rate—ΔP, with a floor of the minimum rate, where ΔP is a change value. The change value determines how quickly the algorithm moves the parking rate toward the minimum rate or maximum rate in response to demand. The change value can be set to a default value (e.g., 3% of current rate) or a different value set by a manager of the parking facility 200.

Referring back to operation 920, if the number of parked cars is not below the target threshold, at operation 940 the control module 130 determines whether the current parking rate is less than the maximum rate. If the current parking rate not less than the maximum rate, the control module sets the new parking rate to the maximum rate at operation 960. If the current parking rate is less than the maximum rate, then at operation 980 the control module sets the new parking rate equal to: current parking rate+ΔP, with a ceiling of the maximum rate.

At operation 990 the control module 130 stores the new rate to be used to update the pricing model dataset 800 for the next occurrence of the time segment. Accordingly, during the next recurring time frame, the pricing model dataset 800 will reflect the updated price for the time segment.

Thus, the usage optimization model implements a pricing strategy to induce usage of the parking facility 200 toward the target threshold capacity. When the number of parked vehicles is below the target threshold, the control module 130 will decrease the parking rate to increase the demand, thereby increasing usage of the parking facility 200. When the number of parked vehicles is above the target threshold, the control module 130 will increase the price to reduce the demand, thereby decreasing usage of the facility 200 and avoiding overcrowding.

Referring back to FIG. 7, at operation 750 the control module 130 can alternatively select a profit optimization model. In one or more embodiments, the profit optimization model is designed to determine a parking rate, based in part on historical data, that will maximize the profit realized by the parking facility 200.

Figure 10:
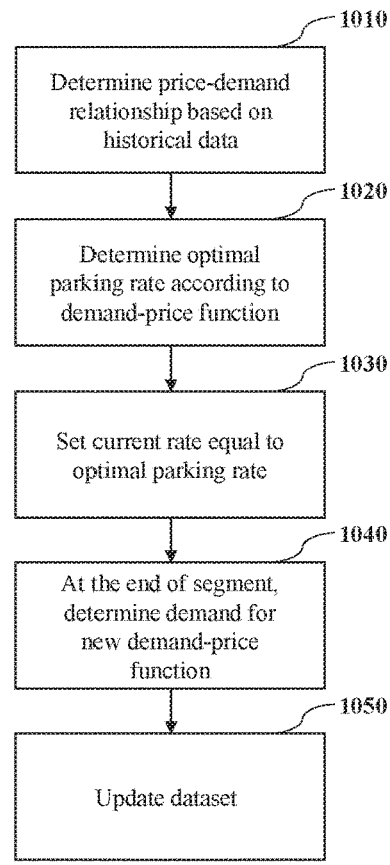
FIG. 10 illustrates a flow chart of a profit optimization model according to the disclosed subject matter.

FIG. 10 shows an example profit optimization model process 1000. At operation 1010, at the start of a time segment the control module 130 determines a price-demand relationship based on data from multiple price model datasets for the time segment. Referring to FIG. 8, to determine the price-demand relationship, as indicated at 1010, the control module 130 can extract data to determine datapoints that represent previous parking rates 840 versus parking demand, which can be quantified, for example, as the median number of parked vehicles 830 in the time segment. The control module 130 can analyze the datapoints, e.g., in a rate-demand graph, to determine relationships between parking rates 840 and parking demand.

Figure 11:
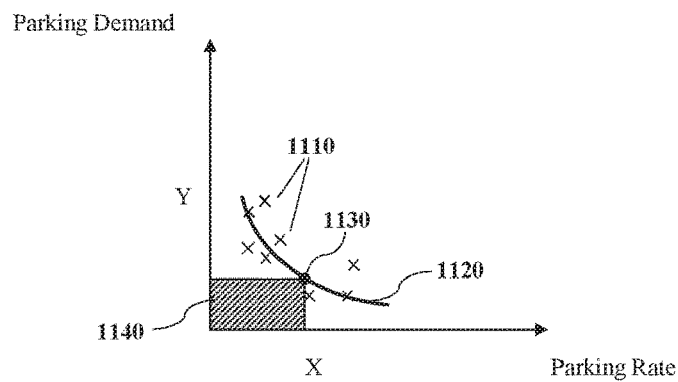
FIG. 11 illustrates an example representation of a rate-demand graph according to the disclosed subject matter.

FIG. 11 shows an example rate-demand graph 1100. The datapoints 1110 are derived from data extracted from multiple price model datasets. Recall that the price model datasets correspond to a given parking duration category (e.g., short term), at a given time segment (e.g., 9:00-9:15 AM), over multiple recurring time frames (e.g., eight "Mondays"). The x-axis of the rate-demand graph 1100 represents the parking rate and the y-axis represents the parking demand. Each datapoint 1110 represents the rate-demand of a different instance of the time segment. For example, a first datapoint 1110 may represent the time segment on a first Monday, a second datapoint 1110 may represent the time segment on a second Monday, and so on.

The data extracted from the multiple price model datasets can collectively be referred to as a rate-demand dataset. The graph 1100 of the rate-demand dataset shows, generally, that as the parking rate increases the parking demand decreases, and vice versa. The control module 130 can determine a relationship between the parking rate and parking demand, for example, by using non-linear regression or another regression technique to determine a demand-price function that generates a demand curve 1120.

In determining the demand-price function, in one or more embodiments, the control module 130 can weight the datapoints 1110 to assign greater weight to more recent parking rates, under the assumption that more recent parking rates may more accurately reflect current demand. For example, in generating the rate-demand dataset, the control module 130 can include three datapoints for the most recent time segment and two datapoints for the next most recent time segment, or use a different weighting method.

Referring back to FIG. 10, at operation 1020, the control module 130 determines an optimal parking rate according to the demand curve 1120 of the demand-price function. For example, the control module 130 can determine an optimal price point 1130 on the demand curve 1120 that results in the maximum profit area 1140.

At operation 1030 the control module 130 can set the current rate equal to the optimal parking rate, e.g., optimal price point 1130.

At operation 1040, at the end of the time segment, the control module 130 determines the demand level that corresponded with the optimal price point 1130. For example, the control module 130 can determine the median number of vehicles that parked in the parking facility 200 under the given parking duration category during the given time segment. At operation 1050 the control module 130 updates the rate-demand dataset with the new demand information for future rate determinations. Accordingly, by using the profit optimization model, the control module 130 will continually adjust the demand curve to reflect demand and continually adjust the rate toward the balance point along the demand curve that yields in the highest profit for the parking facility 200.

The profit optimization model shown in FIG. 10 and the usage optimization model shown in FIG. 9 are two example pricing models that can form part of a set of pricing models that the control module 130 can select a pricing model from. As shown above, the control module 130 can select a pricing model according to at least historical data that indicates past parking rates and past usage levels of the parking facility, and determine a dynamic parking rate according to the pricing model. The set of models can include, for example, a duration-based park rate function, a segmented historical dataset function, a usage optimization model, or a profit optimization model.

Returning to FIG. 7, as previously stated, at operation 760 the control module 130 determines a parking rate, for example, using one of the optimization techniques described above. At operation 770 the control module 130 updates the price model dataset, for example, as described in operation 990 of FIG. 9 or operation 1040 of FIG. 10. Thus, after each of operations 720 (initial park rate function), 740 (pricing model dataset), and 760 (optimization model), the control module 130 updates the price model dataset on a periodic basis (e.g., at the end of each time segment). The process of determining and/or optimizing a dynamic parking rate ends at 780.

In addition to the above described configurations, it should be appreciated that the parking facility control system 100 from FIG. 1 can be configured in various arrangements with separate integrated circuits and/or chips. In such embodiments, the control module 130 and communication module 140 can each be embodied on individual integrated circuits. The circuits can be connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130 and 140 may be combined into a separate application-specific integrated circuit. In further embodiments, portions of the functionality associated with the modules 130 and 140 may be embodied as firmware executable by a processor and stored in a non-transitory memory. In still further embodiments, the modules 130 and 140 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., method 500 of FIG. 5) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The parking facility control system 100 can include one or more processors 110. In one or more arrangements, the processor(s) 110 can be a main processor of the parking facility control system 100. For instance, the processor(s) 110 can be an electronic control unit (ECU). The parking facility control system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A parking facility control system for a parking facility, comprising
    one or more processors; and
    a memory communicably connected to the one or more processors and storing:
    a control module including one or more instructions that, when executed by the one or more processors, cause the one or more processors to select a pricing model from a set of models based at least in part on historical data that indicates past parking rates and past usage levels of the parking facility, periodically determine a dynamic parking rate according to the pricing model, and, in response to receiving a parking request for a vehicle, determine a current parking rate for the vehicle according to at least the dynamic parking rate and attributes of the parking request that indicate at least a parking duration that the vehicle is estimated to be parked at the parking facility, and
    a communication module including one or more instructions that, when executed by the one or more processors, cause the one or more processors to transmit a parking command to the vehicle, where the parking command indicates a parking space and the current parking rate.

2. The parking facility control system of claim 1, wherein, when the historical data is below a threshold amount, the pricing model that is selected includes a park rate function that generates the dynamic parking rate inversely proportional to the parking duration.

3. The parking facility control system of claim 1, wherein the control module includes instructions to periodically update a pricing model dataset, generated from the historical data, that corresponds to a time segment in a recurring time frame, and wherein the pricing model dataset includes data that indicates one or more of the past parking rates and corresponding parking demand associated with the time segment.

4. The parking facility control system of claim 3, wherein periodically determining the dynamic parking rate comprises determining the dynamic parking rate in instances of the time segment as they occur in the recurring time frame, where the recurring time frame corresponds to a weekday, a holiday, or an event.

5. The parking facility control system of claim 3, wherein the control module includes instructions to periodically determine the dynamic parking rate according to the pricing model by determining a demand curve that expresses a relationship between the one or more past parking rates and the corresponding parking demand indicated in the pricing model dataset, and
    determining the dynamic parking rate according to an optimal price point identified on the demand curve.

6. The parking facility control system of claim 5, wherein the pricing model includes instructions to determine the demand curve by:
quantifying the corresponding parking demand as a median number of parked vehicles that were parked in the parking facility, during the time segment, and associated with a parking duration category, where the parking duration category is a defined as a categorical grouping of a range of parking durations; and
determining a relationship between the median number of parked vehicles and the one or more past parking rates using non-linear regression to define the demand curve.

7. The parking facility control system of claim 3, wherein the control module includes instructions to periodically determine the dynamic parking rate according to the pricing model by:
determining a past parking rate according to the pricing model dataset, and updating the dynamic parking rate based, at least in part, on the past parking rate, the pricing model and a number of currently available parking spaces in the parking facility,
where the pricing model includes a minimum rate, a maximum rate and a rate adjustment strategy.

8. The parking facility control system of claim 7, wherein the rate adjustment strategy includes instructions to increase the dynamic parking rate when the dynamic parking rate is less than the maximum rate and the number of currently available parking spaces is greater than a target threshold, and decrease the dynamic parking rate when the dynamic parking rate is greater than the minimum rate and the number of currently available parking spaces is less than the target threshold.

9. A method of managing a parking facility, comprising:
selecting a pricing model from a set of models based, at least in part, on historical data that indicates past parking rates and past usage levels of the parking facility;
determining, periodically, a dynamic parking rate according to the pricing model;
in response to receiving a parking request for a vehicle, determining a current parking rate for the vehicle according to at least the dynamic parking rate and attributes of the parking request that indicate at least a parking duration that the vehicle is estimated to be parked at the parking facility; and
transmitting a parking notification to the vehicle, the parking notification indicating a parking space and the current parking rate.

10. The method of claim 9, wherein selecting the pricing model based, at least in part, on historical data comprises selecting one of the set of models that includes a park rate function when a quantity of the historical data is below a threshold amount, wherein the park rate function generates the dynamic parking rate inversely proportional to the parking duration.

11. The method of claim 9, further comprising periodically updating a pricing model dataset, generated from the historical data, that corresponds to a time segment in a recurring time frame, wherein the pricing model dataset includes data that indicates one or more of the past parking rates and corresponding parking demand.

12. The method of claim 11, wherein periodically determining the dynamic parking rate comprises determining the dynamic parking rate in instances of the time segment as they occur in the recurring time frame, where the recurring time frame corresponds to a weekday, a holiday, or an event.

13. The method of claim 11, wherein periodically determining the dynamic parking rate according to the pricing model includes:
determining a demand curve that expresses a relationship between the one or more past parking rates and the corresponding parking demand indicated in the pricing model dataset; and
determining the dynamic parking rate by identifying an optimal price point on the demand curve.

14. The method of claim 13, wherein determining the demand curve comprises:
quantifying the corresponding parking demand as a median number of parked vehicles that were parked in the parking facility, during the time segment, and associated with a parking duration category, where the parking duration category is a defined as a categorical grouping of a range of parking durations; and
determining a relationship between the median number of parked vehicles and the past parking rates using non-linear regression to define the demand curve.

15. The method of claim 11, wherein periodically determining the dynamic parking rate according to the pricing model includes:
determining a past parking rate according to the pricing model dataset; and
updating the dynamic parking rate based, at least in part, on the past parking rate, the pricing model and a number of currently available parking spaces in the parking facility,
where the pricing model includes a minimum rate, a maximum rate and a rate adjustment strategy.

16. The method of claim 15, wherein rate adjustment strategy comprises:
increasing the dynamic parking rate when the dynamic parking rate is less than the maximum rate and the number of currently available parking spaces is greater than a target threshold; and
decreasing the dynamic parking rate when the dynamic parking rate is greater than the minimum rate and the number of currently available parking spaces is less than the target threshold.

17. A non-transitory computer-readable medium for managing a parking facility and including instructions that when executed by one or more processors cause the one or more processors to:
select a pricing model from a set of models based, at least in part, on historical data that indicates past parking rates and past usage levels of the parking facility;
determine, periodically, a dynamic parking rate according to the pricing model;
in response to receiving a parking request for a vehicle, determine a current parking rate for the vehicle according to at least the dynamic parking rate and attributes of the parking request that indicate at least a parking duration that the vehicle is estimated to be parked at the parking facility; and
transmit a parking notification to the vehicle, the parking notification indicating a parking space and the current parking rate.

18. The non-transitory computer-readable medium of claim 17, further comprising instructions to:
periodically update a pricing model dataset, generated from the historical data, that corresponds to a time segment in a recurring time frame, wherein the pricing model dataset includes data that indicates one or more of the past parking rates and corresponding parking demand.

19. The non-transitory computer-readable medium of claim 18, wherein periodically determining the dynamic parking rate according to the pricing model further comprises instructions to:
- determine a demand curve that expresses a relationship between the one or more past parking rates and the corresponding parking demand indicated in the pricing model dataset; and
- determine the dynamic parking rate by identifying an optimal price point on the demand curve.

20. The non-transitory computer-readable medium of claim 18, wherein periodically determining the dynamic parking rate according to the pricing model further comprises instructions to:
- determine a past parking rate according to the pricing model dataset; and
- update the dynamic parking rate based, at least in part, on the past parking rate, the pricing model and a number of currently available parking spaces in the parking facility,
- where the pricing model includes a minimum rate, a maximum rate and a rate adjustment strategy.

* * * * *

UNITED STATES PATENT AND TRADEMARK OFFICE
CERTIFICATE OF CORRECTION

PATENT NO. : 10,762,723 B1
APPLICATION NO. : 16/382594
DATED : September 1, 2020
INVENTOR(S) : Yumeng Zhou Page 1 of 1

It is certified that error appears in the above-identified patent and that said Letters Patent is hereby corrected as shown below:

In the Claims

Column 21, Line 8 Claim 6 should read:
parking duration category is defined as a categorical Column 22, Line 16 Claim 14 should read:
parking duration category is defined as a categorical Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*